United States Patent
Zhang et al.

(10) Patent No.: US 7,133,486 B2
(45) Date of Patent: Nov. 7, 2006

(54) EVER-INCREASING QUALITY FOR STORED VIDEO STREAMING IN A MOBILE WIRELESS INTERWORKING ENVIRONMENT

(75) Inventors: Junbiao Zhang, Bridgewater, NJ (US); Jun Li, Plainsboro, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 132 days.

(21) Appl. No.: 10/518,997

(22) PCT Filed: Jun. 19, 2003

(86) PCT No.: PCT/US03/19278
§ 371 (c)(1),
(2), (4) Date: Dec. 21, 2004

(87) PCT Pub. No.: WO04/002091
PCT Pub. Date: Dec. 31, 2003

(65) Prior Publication Data
US 2006/0156347 A1 Jul. 13, 2006

(51) Int. Cl.
*H04L 23/00* (2006.01)
(52) U.S. Cl. ............... 375/377; 725/87; 725/134; 725/145; 725/94
(58) Field of Classification Search .......... 375/377; 725/105, 115, 109–110, 118, 131, 134, 62, 725/143, 145, 87–88, 81, 94
See application file for complete search history.

(56) References Cited

U.S. PATENT DOCUMENTS

| | | | |
|---|---|---|---|
| 5,404,505 A * | 4/1995 | Levinson | 707/10 |
| 5,640,453 A * | 6/1997 | Schuchman et al. | 380/211 |
| 5,767,893 A | 6/1998 | Chen et al. | |
| 5,818,440 A | 10/1998 | Allibhoy et al. | |
| 5,884,028 A * | 3/1999 | Kindell et al. | 709/234 |
| 6,018,359 A * | 1/2000 | Kermode et al. | 725/101 |
| 6,654,956 B1 * | 11/2003 | Trinh et al. | 725/100 |
| 2003/0038807 A1* | 2/2003 | Demos et al. | 345/473 |
| 2005/0091695 A1* | 4/2005 | Paz et al. | 725/110 |
| 2005/0125840 A1* | 6/2005 | Anderson et al. | 725/118 |
| 2005/0156869 A1* | 7/2005 | Mori et al. | 345/104 |

OTHER PUBLICATIONS

Copy of Search Report Dated Sep. 4, 2003.

* cited by examiner

*Primary Examiner*—Jean B. Corrielus
(74) *Attorney, Agent, or Firm*—Joseph J. Laks; Robert D. Sheddi; Cathrine A. Ferguson (57) ABSTRACT

There is provided a method for managing the downloading and display of a video program using a mobile device in an networking environment that includes a first radio access network and a second radio access network that has a faster transfer rate than the first network. A layer of video program that has been encoded into multiple layers is downloaded via the first or second network. The downloaded video program is displayed at a playback rate that corresponds to a display quality. Excess portion of the downloaded video program that result when a rate at which the video program is displayed are buffered. The number of layers being downloaded and the playback rate at which the video program is displayed are increased to increase the display quality, when the buffered excess portions exceeds a threshold level.

28 Claims, 5 Drawing Sheets

EVER-INCREASING QUALITY FOR STORED VIDEO STREAMING IN A MOBILE WIRELESS INTERWORKING ENVIRONMENT

This application claims the benefits, under 35 U.S.C. 365 of international Application PCT/US03/19278, filed Jun. 19 2003, which was published in accordance with PCT Article 21(2) on Dec. 31, 2003 in English.

BACKGROUND OF THE INVENTION

1. Field of the Invention

The present invention generally relates to downloading and displaying a video program from networks and, more particularly, to a method and a mobile terminal for downloading and displaying a video program by the mobile device in an interworking environment comprising a first radio access network having a first data transfer rate and a second radio access network having a second data transfer rate that is faster than the first data transfer rate.

2. Background of the Invention

In an interworking that includes two networks such as, for example, a Third Generation (3G) cellular network and a Wireless Local Area Network (WLAN), it is desirable to take advantage of the increased bandwidth of the faster network (e.g., the WLAN) to download and display higher quality video whenever a mobile terminal enters the coverage area of the faster network.

For video streaming, there are currently two main approaches to make use of the higher bandwidth. The first approach is to switch between a high display rate and a low display rate when a mobile terminal moves in and out of a higher bandwidth coverage area. The second approach is to keep a constant low display rate even in the higher bandwidth coverage area.

The end result of the first approach is actually very annoying to mobile users, especially for relatively high mobility usage scenarios. Users would rather maintain a constant quality than frequently switch their quality perception levels. The second approach maintains the same low display quality, but it does not take full advantage of the higher bandwidth coverage area.

Accordingly, it would be desirable and highly advantageous to have a method and mobile terminal capable of taking advantage of increased bandwidth in an interworking environment, while overcoming the above-described deficiencies of the prior art.

SUMMARY OF THE INVENTION

The problems stated above, as well as other related problems of the prior art, are addressed by the present invention, which is directed to a method and mobile terminal for managing the downloading and display of a video program by the mobile terminal in an interworking environment. The present invention takes advantage of the increased bandwidth provided in higher bandwidth areas of the interworking environment to increase the number of layers being downloaded and to increase the playback rate so as to increase the video display quality.

According to an aspect of the present invention, there is provided a method for managing the downloading and display of a video program using a mobile device in an interworking environment. The interworking environment includes a first radio access network having a first data transfer rate and a second radio access network having a second data transfer rate that is faster than the first data transfer rate. A layer of a video program that has been encoded into multiple layers is downloaded via the first or second radio access networks, such that the video program is downloaded at the faster data transfer rate when the mobile terminal is in the coverage area of the second radio access network. The downloaded video program is displayed at a playback rate that corresponds to a display quality. Excess portions of the downloaded video program that result when a rate at which the video program is being downloaded exceeds a rate at which the video program is displayed are buffered. The number of layers being downloaded and the playback rate at which the video program is displayed are increased to increase the display quality, when the buffered excess portions of the downloaded video program exceeds a threshold level.

According to another aspect of the present invention, there is provided a mobile terminal for managing the downloading and display of a video program in an interworking environment. The interworking environment includes a first radio access network having a first data transfer rate and a second radio access network having a second data transfer rate that is faster than the first data transfer rate. A receiver downloads, via the first or second radio access networks, a layer of a video program encoded into multiple layers. The video program is downloaded at the faster data transfer rate when the mobile terminal is in the coverage area of the second radio access network. A display displays the downloaded video program at a playback rate that corresponds to a display quality. A memory device buffers excess portions of the downloaded video program that result when a rate at which the video program is being downloaded exceeds a rate at which the video program is displayed. A processor increases the number of layers being downloaded and the playback rate at which the video program is displayed to thereby increase the display quality, when the buffered excess portions of the downloaded video program exceed a threshold level.

According to yet another aspect of the present invention, there is provided a method for managing the downloading and display of a video program using a mobile device in an interworking environment. The interworking environment includes a first radio access network having a first data transfer rate and a second radio access network having a second data transfer rate that is faster than the first data transfer rate. A layer of a video program that has been encoded into multiple layers is downloaded via the first or second radio access networks such that the video program is downloaded at the faster data transfer rate when the mobile terminal is in the coverage area of the second radio access network. The downloaded video program is displayed at a playback rate that corresponds to a display quality. A current layer and the next layer of the video program is downloaded at the same time when the mobile terminal enters the coverage area of the second radio access network, even if the current layer of the video program is still being downloaded. The playback rate at which the video program is displayed is increased to increase the display quality, when the entire next layer has been completely downloaded.

According to still yet another aspect of the present invention, there is provided a mobile terminal for managing the downloading and display of a video program using a mobile device in an interworking environment. The interworking environment includes a first radio access network having a first data transfer rate and a second radio access network having a second data transfer rate that is faster than the first data transfer rate. A receiver downloads, via the first or second radio access networks, a layer of a video program encoded into multiple layers. The video program is downloaded at the faster data transfer rate when the mobile terminal is in the coverage area of the second radio access network. The receiver further downloads a current layer and the next layer of the video program at the same time when the mobile terminal enters the coverage area of the second radio access network even if the current layer of the video program is still being downloaded. A display displays the downloaded video program at a playback rate that corresponds to a display quality, and increases the playback rate at which the video program is displayed to thereby increase the display quality when the entire next layer has been completely downloaded.

DETAILED DESCRIPTION OF THE INVENTION

The present invention is directed to a method and a mobile terminal for downloading and displaying a video program by the mobile device in an interworking environment. The present invention takes advantage of the increased bandwidth provided in higher bandwidth areas of the interworking environment by increasing the number of layers of a video program being downloaded as well as increasing the playback rate at which the video program is displayed so as to increase the display quality. As used herein, the phrase "video program" refers to a program that includes, at the least, video data, and may or may not also include other data such as, for example, audio data.

To further explain the relation between the playback rate and the display quality, the playback rate corresponds to the display quality in that the playback increases for higher display qualities because a larger amount of data needs to be processed in a given amount of time. Conversely, the playback rate decreases for lower display qualities because a smaller amount of data needs to be processed in a given time. Thus, as used herein, the value of the playback rate at any given time generally relates to a corresponding display quality.

The present invention is applicable to video that has been encoded into multiple layers. In general, the multiple layers include a base layer and at least one subsequent layer. As will be described below, each layer of a video program to be downloaded and displayed according to the present invention is associated with an incremental change to a playback rate that corresponds to display quality. Thus, according to the present invention, a subsequent layer of a video program may be displayed using a playback rate, or display rate, that is higher than a preceding layer of the video program. Examples of layered video media to which the present invention may be applied include, but are not limited to, Moving Pictures Experts Group (MPEG) media, Joint Video Team (JVT) media, which are well known to those skilled in the art.

Figure 1:
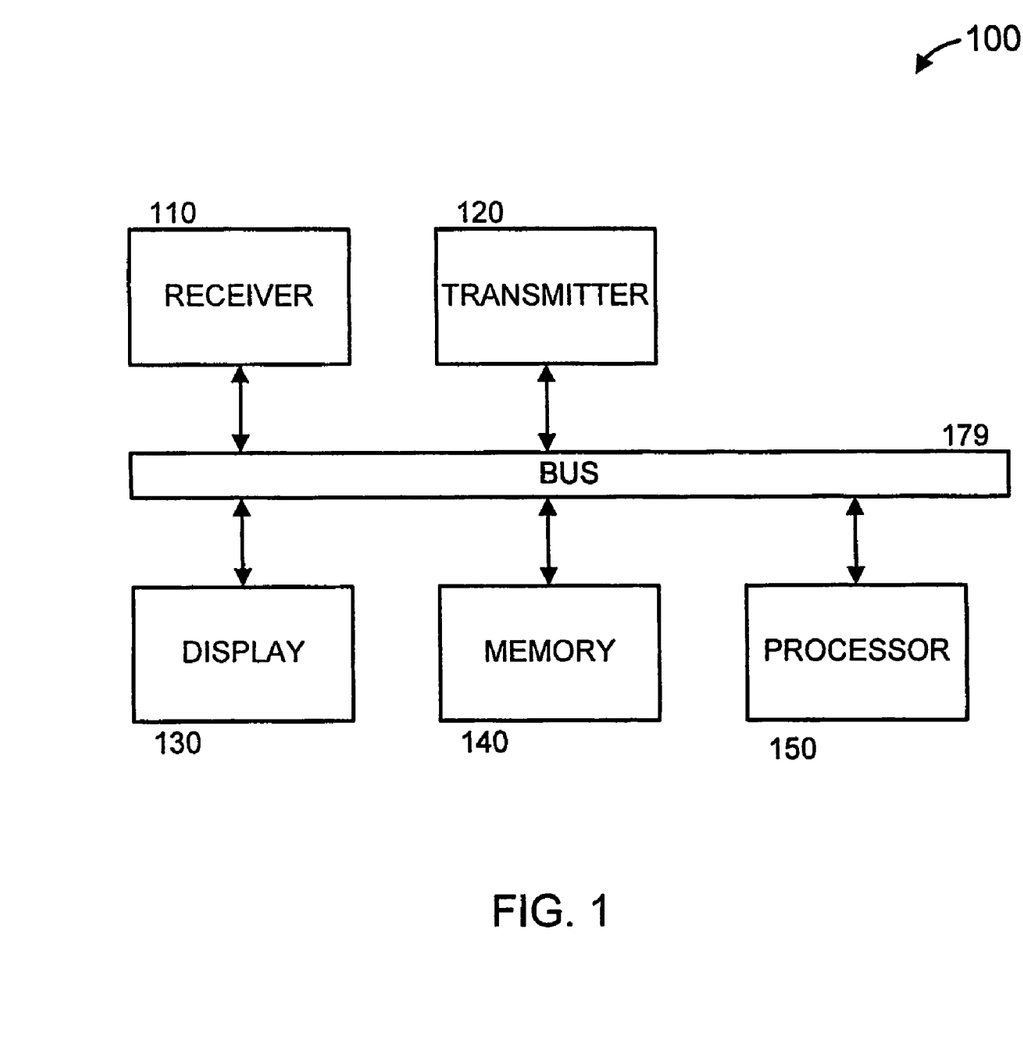
FIG. 1 is a block diagram illustrating a mobile terminal 100 to which the present invention may be applied according to an illustrative embodiment of the present invention.
Figure 2:
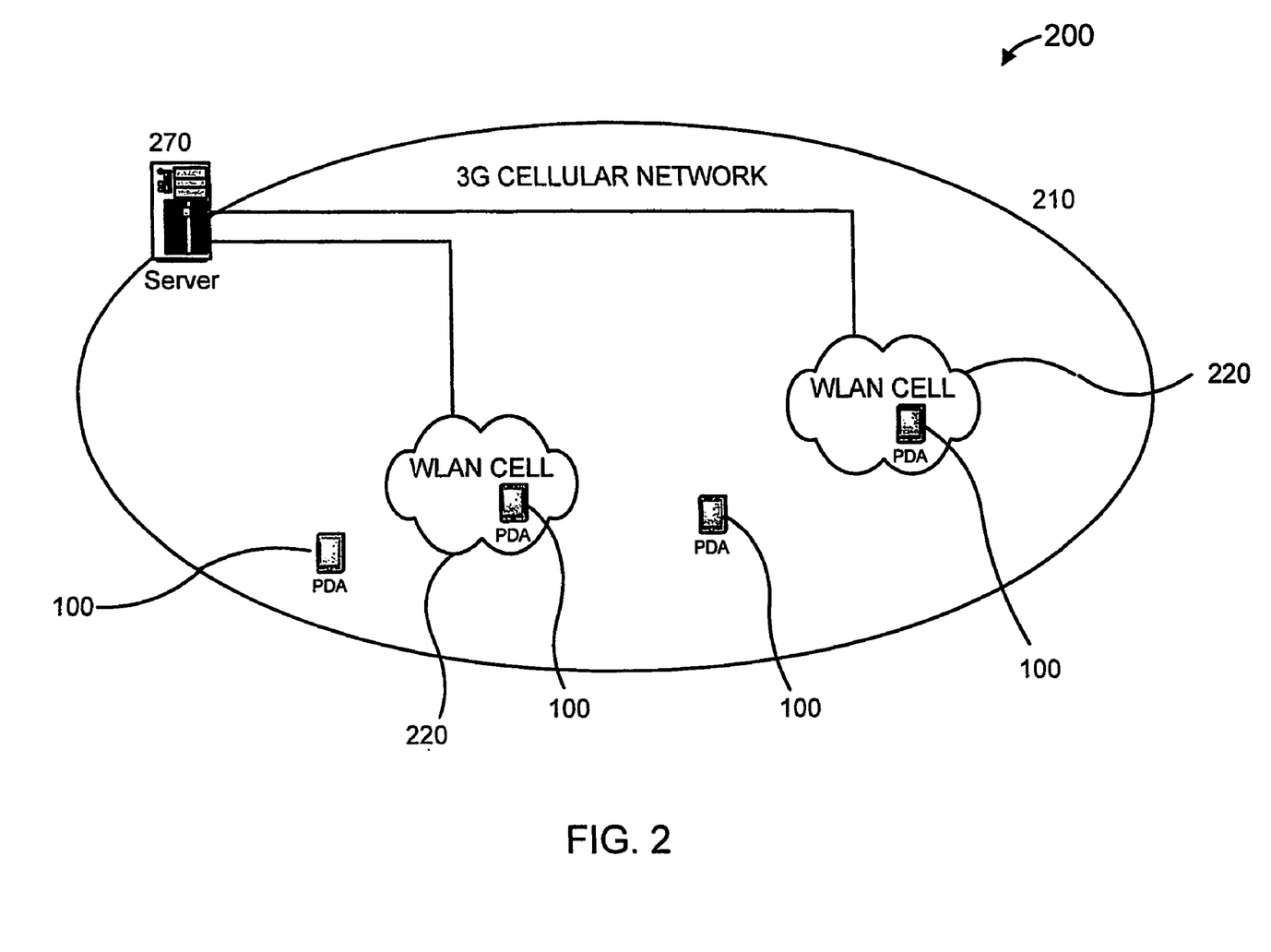
FIG. 2 is a block diagram illustrating an interworking environment 200 to which the present invention may be applied according to an illustrative embodiment of the present invention.

In the illustrative embodiments described herein, the base layer of a given layered media (e.g., video program) is larger than any of the additional subsequent layers. Moreover, the size of each subsequent layer is less than a preceding layer but more than a next layer. Such layered media is illustratively shown in FIGS. 4 and 6 that respectively correspond to two illustrative embodiments of the present invention. In particular, FIGS. 3 and 4 correspond to a first illustrative embodiment of the present invention and FIGS. 5 and 6 correspond to a second illustrative embodiment of the present invention. FIGS. 1 and 2 generally apply to both illustrative embodiments of the present invention. However, it is to be appreciated that the present invention is not limited to layered media arranged and structured as described above and, thus, layered media having other structures and arrangements may also be employed while maintaining the spirit and scope of the present invention. For example, the size of each subsequent layer need not be less than a preceding layer nor more than a next layer.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The present invention is directed to an interworking environment. Such an interworking environment may include, for example, ubiquitous low speed first radio access network and a second radio access network having a much higher data transfer speed and lower access cost. The present invention allows users with relatively high mobility to take full advantage of such an environment in stored video streaming applications.

Examples of low rate radio access networks to which the present invention may be applied (e.g., radio A above) include, but are not limited to, fixed or mobile wireless wide area networks such as third generation (3G), second generation plus (2.5G), second generation (2G), and first generation (1G) cellular networks, and so forth. Examples of high rate radio access networks to which the present invention may be applied (e.g., radio B above) include, but are not limited to, Wireless Local Area Networks (WLANs) and so forth. The WLANs may be, for example, those compliant with IEEE 802.11 or Hiperlan 2.

For ease of presentation, the following description of the present invention shall employ a 3G cellular network as radio A and a WLAN as radio B. However, it is to be appreciated that the present invention is not limited to the preceding communication technologies and network types. Moreover, it is to be appreciated that the present invention may be applied to an interworking between more than two networks while maintaining the spirit and scope of the present invention. Further, it is to be appreciated that the present invention may be applied to all or a subset of the networks that are part of an interworking while maintaining the spirit and scope of the present invention.

According to an illustrative embodiment of the present invention, a mobile terminal downloads the video program at a higher data transfer rate when occasionally passing through high-speed WLAN micro-cells. As a result of the higher data transfer rate, excess portions of the downloaded data is buffered in a memory device of the mobile terminal. In accordance with the present invention, when the amount of buffered data exceeds a threshold level, the display quality of the video is increased while ensuring that the display quality will never be degraded even after the MT moves out of a WLAN cell. In particular, the threshold level is determined based on the amount of playback time remaining in the video program and the amount of data that can be downloaded during that time, even if the mobile terminal moves into the area of low data transfer rate, such that the higher quality display can be maintained based on the buffered excess, the viewing time remaining and the additional data that can be downloaded during the remaining viewing time.

FIG. 1 is a block diagram illustrating a mobile terminal 100 to which the present invention may be applied, according to an illustrative embodiment of the present invention. The mobile terminal 100 includes a receiver 110, a transmitter 120, a display 130, a memory 140, and a processor 150, all interconnected by a bus 179. The receiver 110 is configured to receive data from either one of the two radio access networks. The mobile terminal may be, but is not limited to, a cellular phone, a Personal Digital Assistant (PDA), a laptop computer, and so forth. The arrangement and operation of such elements in those devices are well known to those skilled in the art.

FIG. 2 is a block diagram illustrating an interworking environment 200 to which the present invention may be applied, according to an illustrative embodiment of the present invention. The interworking environment 200 includes a first radio access network 210, which in the illustrative embodiment is a 3G network, and second radio access network areas 220, which in the illustrative embodiment are WLANs, dispersed there through. A mobile terminal 100 moves through coverage areas of the first and second radio access networks, possibly including areas of dual coverage. A server 270, accessible from both the first radio access network 210 and the second radio access network 220, functions as a source from which a video program can be downloaded to the mobile terminal 100.

A detailed description of a first illustrative embodiment of the present invention will now be given with respect to FIGS. 3 and 4. The following general description applies to an interworking that includes a 3G cellular network and a WLAN, where the 3G cellular network has a slower data transfer rate than the WLAN. However, as noted above, the present invention may be employed with respect to more than two networks and with other different networks, all while maintaining the spirit and scope of the present invention.

Once in a WLAN cell, a Mobile Terminal (MT) attaches to the WLAN using established protocols and methods, and starts downloading the video content to local storage using WLAN access. Given the discrepancy between the downloading rate and the playback rate, after some time has elapsed from the start of downloading, the MT will have a certain amount of buffered video.

We can then take advantage of this buffered amount to increase the video display quality with the assurance that it will not drop For illustrative purposes, the following notations are employed herein:

Buffered amount: $B_t$

Data transfer rate in the 3G coverage area: $R_g$

Playback rate: $R_p$

Time duration for the rest of the video: T

Moreover, the following constraint is employed:

$$(R_p - R_g) * T <= B_t$$

Advantageously, the present invention ensures that once the video display quality (video playback rate) is increased while within range of the WLAN coverage, the video quality will not fall back for the remainder of the video session even if the mobile terminal moves back into lower data rate 3G coverage. The original playback rate is designated herein as $R_g$. At a given moment when the MT is downloading in a WLAN cell, the buffered amount is $B_t$ and the time duration for the remainder of the unplayed video is T, the MT can make the following worst-case calculation. Assuming that the MT would immediately leave the coverage range of the WLAN cell and would not enter the coverage range of a WLAN cell again for the remainder of the video session, the maximum playback rate that we can upgrade to is as follows:

$$R_p = B_t / T + R_g$$

Thus, when downloading is continued, the playback rate can be safely upgraded and once upgraded, the rate will not drop even if the MT moves out the WLAN cell immediately after the upgrade and remains in the 3G coverage for the remainder of the session.

Advantageously, the present invention employs layered coding to provide the above advantages and features. That is, the stored video is coded into multiple layers. For illustrative purposes, the following designations and constraints are employed: the base layer has rate $R_0$; each additional layer adds $\Delta R_i$, $i=0,1,\ldots,n$; $\Delta R_i < R_g$; ad the current playback rate is $R_k$. These rates may be determined in various ways, including, but not limited to, based on information included with the downloaded program data, based on information transmitted from the radio access networks separately from the downloaded program data, based on previous downloads, and based on predetermined rates.

When the MT is downloading in a WLAN cell, it checks the downloaded amount and the residual time of the video session, and as soon as the downloaded amount can make $R_p$ safely jump to $R_k+\Delta R_k$, the MT starts downloading the next layer along with the current layer(s) and the playback rate is upgraded to $R_k+\Delta R_k$. This upgraded playback rate (video display quality) will be sustained throughout the remainder of the video session. Thus, even if the mobile terminal immediately leaves the coverage area of a WLAN cell and immediately returns to the coverage area of the 3G cellular network after the playback rate has just been updated, the upgraded playback rate will be maintained during the duration of the playing back of the video program.

Figure 3:
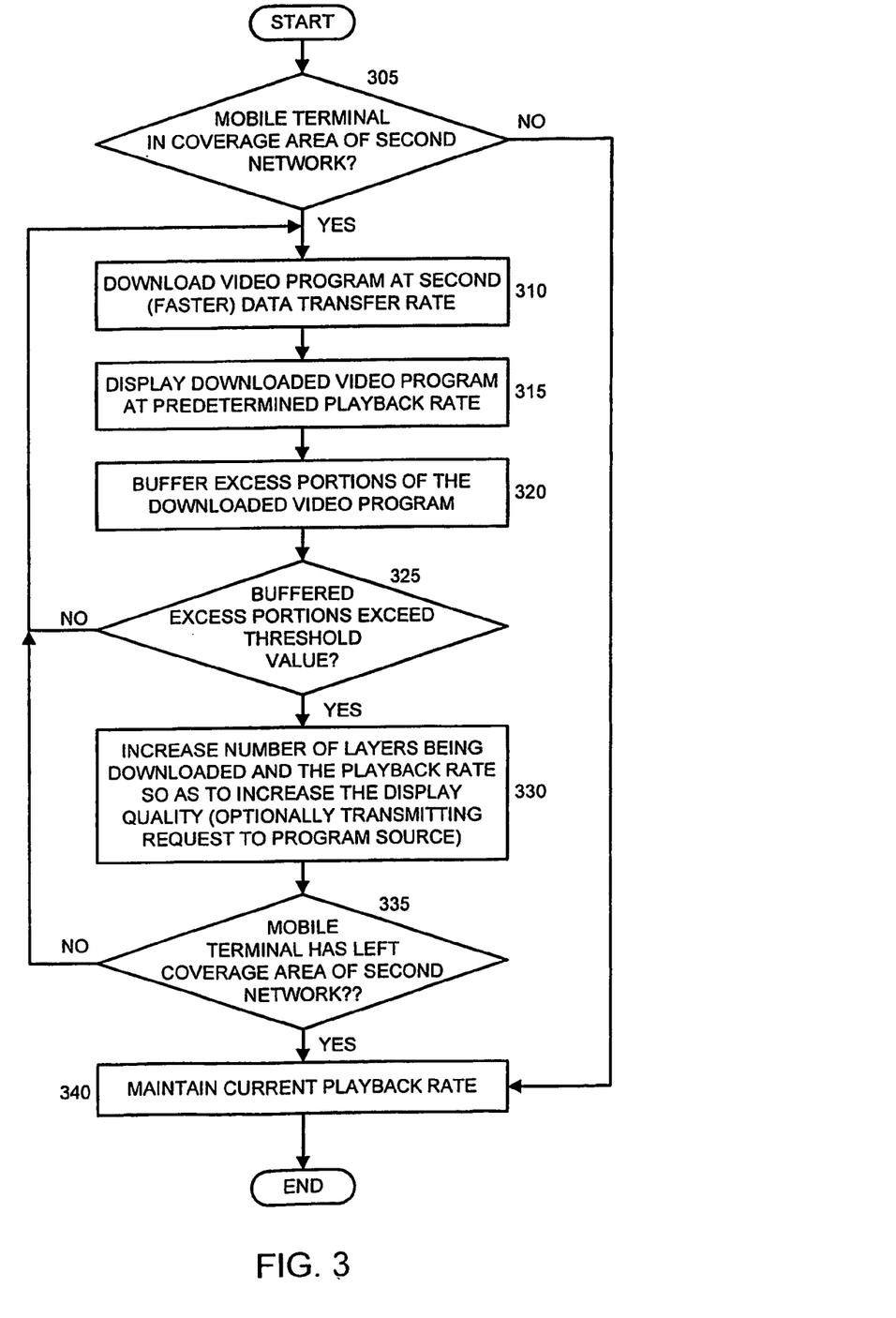
FIG. 3 is a flowchart illustrating the steps for downloading and displaying a video program using a mobile terminal in an interworking environment according to an illustrative embodiment of the present invention.

FIG. 3 is a flow chart illustrating the steps for downloading and displaying a video program using a mobile terminal in an interworking environment according to a first illustrative embodiment of the present invention. In the illustrative embodiment of the FIG. 3, the first radio access network has a first data transfer rate and the second radio access network has a second data transfer rate that is faster than the first data transfer rate.

It is determined whether the mobile terminal has entered a coverage area of the second radio access network (step 305). If so, the mobile terminal attaches to the second radio access network and begins downloading the video program at the second (faster) data transfer rate (step 310).

It is to be appreciated that the mobile terminal may or may not have been in the coverage area of the first radio access network and downloading the video program in that area (at the first (slower) data transfer rate) prior to entering the coverage area of the second radio access network as determined at step 305. That is, the present invention does not require any particular or pre-specified sequence of movements by the mobile terminal through the various networks to obtain the benefits of the present invention. All that is necessary is that the mobile terminal is able to detect and utilize the first and second radio access networks that interwork to download a particular program.

The downloaded video program is displayed on the mobile terminal at a playback rate that corresponds to a predetermined display quality (step 315). Excess portions of the downloaded video program (that result when a rate at which the video program is downloaded exceeds the predetermined playback rate) are buffered (step 320).

It is then determined whether the buffered excess portions of the downloaded video program exceed a threshold value (step 325). If so, then the method proceeds to step 330. Otherwise, the method returns to step 310.

The threshold value employed at step 325 may be equal to, for example, the time duration of the remainder of the video program to be played back multiplied by the difference between the playback rate and the first data transfer rate. Using the nomenclature defined above, the threshold as previously described may be represented as follows:

$$\text{threshold}=T^*(R_p-R_g)$$

The threshold value corresponds to that value where sufficient excess program portions have been stored in the buffer such that the higher playback level can be maintained for the duration of the program even if the data transfer rate fall to the lower rate for the time remaining in the program. This threshold value may be calculated periodically or continuously during the course of the playback as desired. Various threshold values may be set based on the numbers of layers available to determine at which point the playback may be increased from one layer to the next. For example, if the program comprises 5 layers, respective thresholds may be determined to increase the playback from a first playback rate to a second rate, and then from a second rate to a third rate, and so forth. In each case, once the playback level has been increased to the next rate, playback remains at least at that rate regardless of the download data transfer rate.

At step 330, the number of layers being downloaded is increased, and the playback rate at which the video program is displayed is increased so as to increase the display quality. For each additional layer being downloaded, the playback rate may be increased to a value that is equal to the sum of the current playback rate and an incremental playback rate increase corresponding to that additional layer. It is to be appreciated that step 330 may optionally include the step of transmitting a request from the mobile terminal to a source of the video program for the source to increase the number of layers being broadcast to the mobile terminal.

It is to be appreciated that the amounts of increase, both to the number of layers and to the playback rate, are dependent upon the amount of the buffered excess portions of the downloaded video program as well as the time duration of the remainder of the video program to be played back. Further, the increase to the playback rate is based upon which layers are being downloaded since, as noted above, each layer adds an incremental change to the playback rate (and hence an incremental change to the video display quality).

It is determined whether the mobile terminal has left the coverage area of the second radio access network and is within the coverage area of the first radio access network (step 335). If not, then the method returns to step 310. Otherwise, the current playback is maintained while the downloading of the video program returns to the first data transfer rate (step 340). It is to be appreciated that the current playback rate is maintained irrespective of whether the mobile terminal stays within the coverage area of the first data network for the duration of the playback or the downloading of the video program. Moreover, it should be noted that the downloading or streaming rate in the slower network (i.e., the first radio access network) should be greater than the rate required by the additional layer(s).

Figure 4:
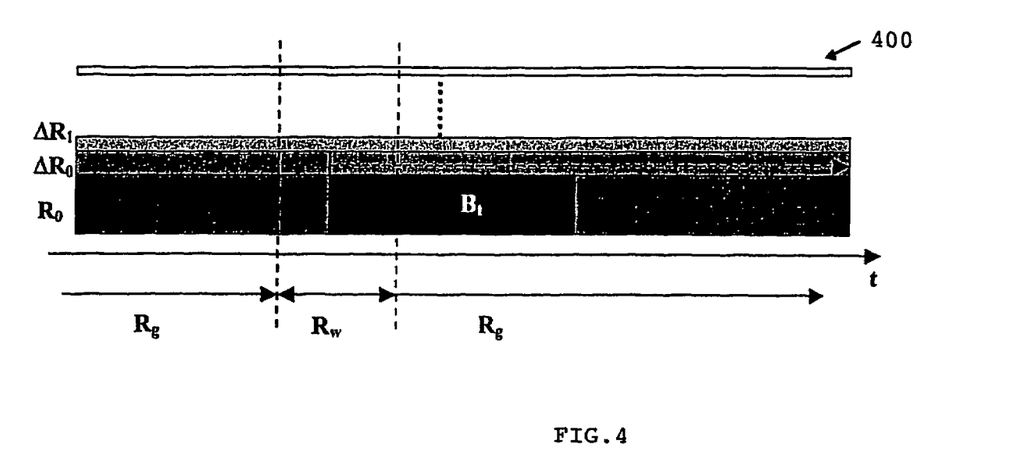
FIG. 4 is a diagram illustrating the downloading of a layered media with respect to data transfer rate versus time, according to an illustrative embodiment of the present invention.

FIG. 4 is a diagram illustrating the downloading of a layered media 400 with respect to data transfer rate versus time, according to the first illustrative embodiment of the present invention.

The layered media includes multiple layers which are downloaded at the data transfer rate $R_g$ in the 3G coverage area and at a data transfer rate $R_w$ in the WLAN coverage area. The playback rate is intended to increase with the downloading of each subsequent layer as described above with respect to FIG. 3. As such the playback rate $R_o$ for the base layer is less than the playback rate for subsequent layer(s) $R_i$.

A description of a second illustrative embodiment of the present invention will now be given with respect to FIGS. 5 and 6. In the second illustrative embodiment, the mobile terminal starts downloading an additional layer as soon as the mobile terminal enters the faster network (e.g., the WLAN), and the playback rate (display quality) is upgraded when the rest of the whole additional layer is downloaded in the WLAN. The base layer is generally larger than any of the additional layers, and the faster network (e.g. WLAN) has far greater throughput than the slower network (e.g. cellular). Thus, it is possible to finish downloading the entire additional layer within the faster network. As noted above, the layered media need not follow the physical size constraints with respect to the layers thereof as shown in FIGS. 4 and 6 and, thus, other structures may be employed for the layered media while maintaining the spirit and scope of the present invention. For example, each subsequent layer need not be smaller in size than the preceding layer.

One advantage of this embodiment is that the additional layer may not need to be available in the slower network (e.g., in the case when different layers are broadcast in different types of wireless networks).

Figure 5:
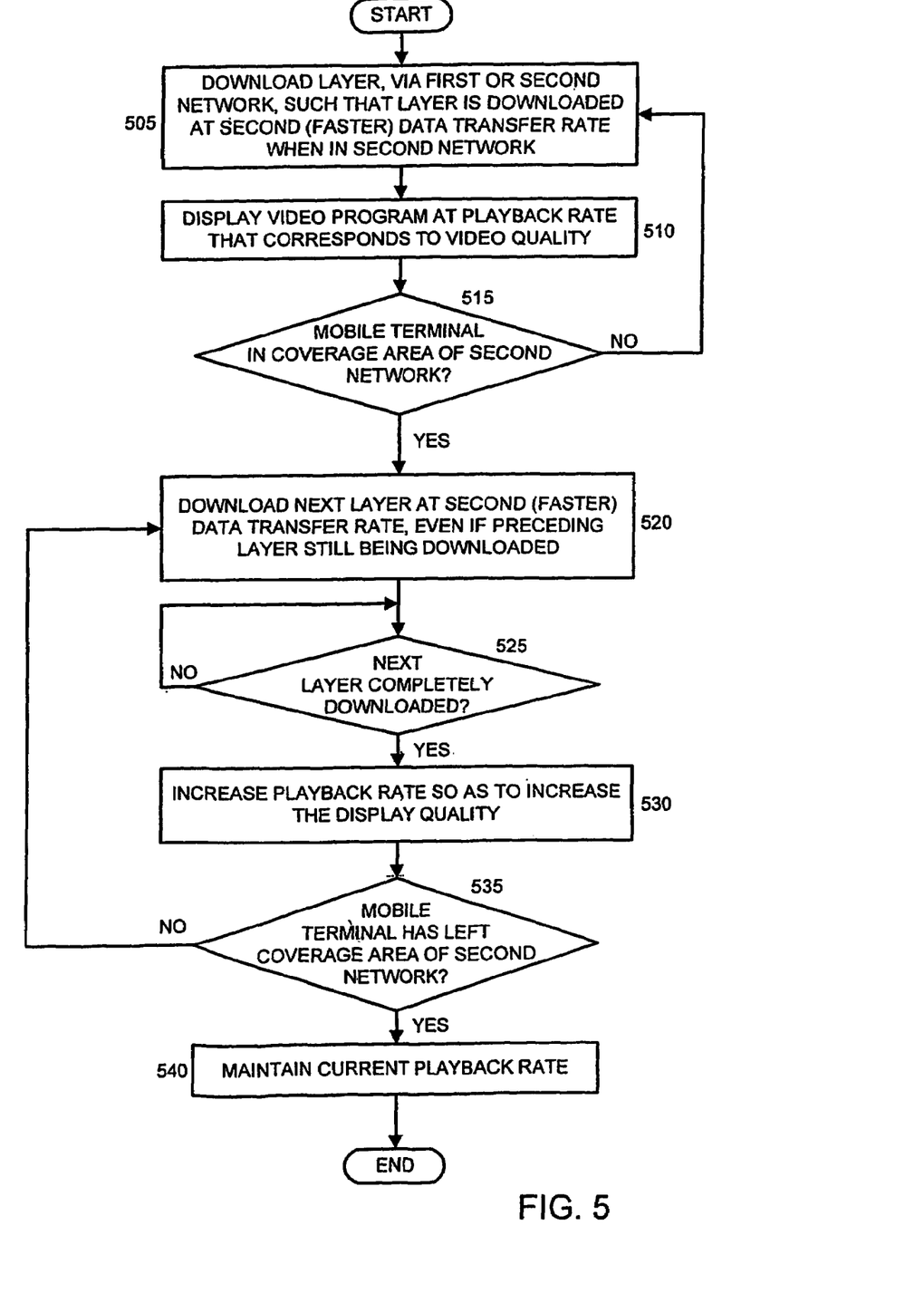
FIG. 5 is a flowchart illustrating the steps for downloading and displaying a video program using a mobile terminal in an interworking environment according to another illustrative embodiment of the present invention.
Figure 6:
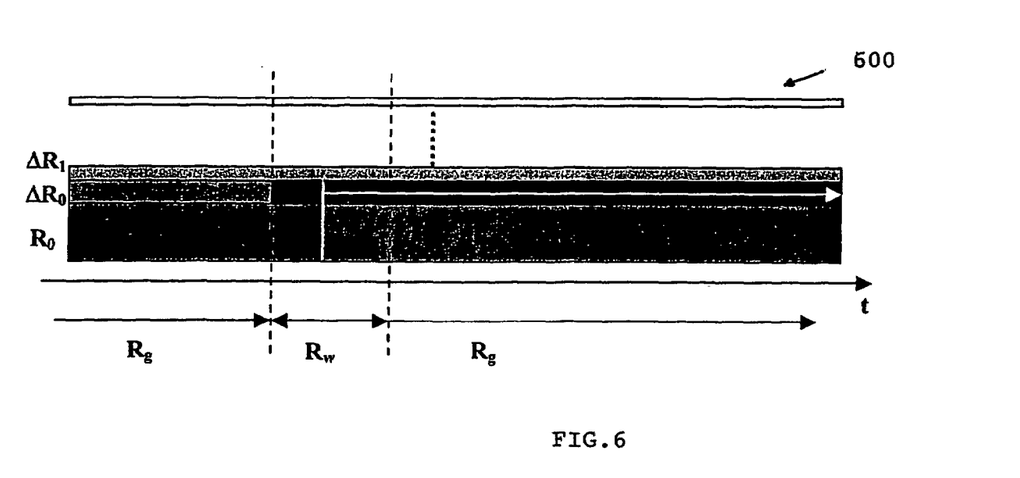
FIG. 6 is a diagram illustrating the downloading of a layered media with respect to data transfer rate versus time, according to another illustrative embodiment of the present invention.

FIG. 5 is a flow chart diagram illustrating steps for downloading and displaying a video program using a mobile terminal in an interworking environment according to a second illustrative embodiment of the present invention. In the illustrative embodiment of the FIG. 5, the first radio access network has a first data transfer rate and the second radio access network has a second data transfer rate that is faster than the first data transfer rate. Further, the video program is encoded into multiple layers.

A layer of the video program is downloaded, via the first or second radio access network, wherein the layer is downloaded at the faster data transfer rate when the mobile terminal is within the coverage area of the second radio access network (step 505).

The downloaded video program is displayed on the mobile terminal at a playback rate that corresponds to a predetermined display quality (step 510).

It is determined whether the mobile terminal has entered a coverage area of the second radio access network (step 515). If so, then the mobile terminal begins downloading a next layer of the video program, even if a current, or preceding, layer of the video program is still being downloaded, with the layers being downloaded at the second (faster) data transfer rate (step 520). Otherwise, the method returns to step 505.

With respect to step 520, the next layer is preferably downloaded starting at a current playback point. In this way, continuity is maintained with respect to the content being played back.

It is then determined whether the next layer that commenced downloading at step 520 has been completely downloaded (step 525). If so, then the playback rate at which the video program is displayed is increased so as to increase the display quality (step 530). Otherwise, the method returns to step 525.

It is to be appreciated that the increase to the playback rate is based upon which layer(s) is being downloaded since, as noted above, each layer adds, when applicable, an incremental change to the playback rate (and hence an incremental change to the video display quality).

It is determined whether the mobile terminal has left the coverage area of the second radio access network and is within the coverage area of the first radio access network (step 535). If not, then the method returns to step 520. Otherwise, the current playback is maintained (step 540). It is to be appreciated that the current playback rate is maintained irrespective of whether the mobile terminal stays within the coverage area of the first data network for the duration of the playback or the downloading of the video program.

FIG. 6 is a diagram illustrating the downloading of a layered media 600 with respect to data transfer rate versus time, according to the second illustrative embodiment of the present invention.

The layered media includes multiple layers which are downloaded at the data transfer rate $R_g$ in the 3G coverage area and at a data transfer rate $R_w$ in the WLAN coverage area. The playback rate is intended to increase, when applicable, with the downloading of each subsequent layer as described above with respect to FIG. 3.

Advantageously, the present invention can provide a constant video quality increase as the direct benefit of "occasionally crossing" WLAN cells. Moreover, the present invention advantageously does not require a determination of how long the mobile terminal will be inside the WLAN cells.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. For example, although the present embodiments are described with reference to video programs, it is clear that the present invention is applicable to audio programs, and other multimedia programs that may be downloaded through radio access networks. All such changes and modifications are intended to be included within the scope of the invention as defined by the appended claims.

What is claimed is:

1. A method for downloading and displaying a video program using a mobile terminal in an interworking environment that includes a first radio access network having a first data transfer rate and a second radio access network having a second data transfer rate that is faster than the first data transfer rate, the method comprising the steps of:

downloading, via the first or second radio access networks, a layer of the video program encoded into multiple layers, the video program being downloaded at the second data transfer rate when the mobile terminal is in the coverage area of the second radio access network;

displaying the downloaded video program at a playback rate that corresponds to a display quality;

buffering excess portions of the downloaded program that result when a rate at which the video program is being downloaded exceeds a rate at which the video program is displayed; and increasing the number of layers being downloaded, and the playback rate at which the video program is displayed to thereby increase the display quality, when the buffered excess portions of the downloaded program exceeds a threshold level.

2. The method of claim 1, wherein the threshold level corresponds to a time duration of a remainder of the program to be played back multiplied by a difference between a current playback rate and the first data transfer rate.

3. The method of claim 1, wherein the increasing step comprises the step of limiting the playback rate to a maximum value that is equal to a sum of the first data transfer rate and a quotient resulting from dividing the buffered excess portions of the downloaded program by a time duration of the remainder of the program to be played back.

4. The method of claim 1, wherein the increasing step comprises increasing the playback rate by an amount that corresponds to the number of layers being downloaded, such that each additional layer being downloaded results in an incremental change to the playback rate.

5. The method of claim 1, further comprising the step of continuing to download the program from the first radio access network while maintaining a last playback rate from the second radio access network for a duration of playing back the program, when the mobile terminal is again within the coverage area of the first radio access network.

6. The method of claim 1, further comprising the step of maintaining a last playback rate from the second radio access network for a duration of playing back the layered media, when the mobile terminal is again within the coverage area of the first radio access network and the entire program has been completely downloaded.

7. The method of claim 1, wherein the increasing step comprises the step of transmitting to a source of the program a request to increase the number of layers being transmitted.

8. The method of claim 1, wherein the first radio access network is a 3G network and the second radio access network is a Wireless Local Area Network (WLAN).

9. A mobile terminal for downloading and displaying a video program in an interworking environment that includes a first radio access network having a first data transfer rate and a second radio access network having a second data transfer rate that is faster than the first data transfer rate, the mobile terminal comprising:

a receiver for downloading, via the first or second radio access networks, a layer of the video program encoded into multiple layers, the video program being downloaded at the faster data transfer rate when the mobile terminal is in the coverage area of the second radio access network;

a display for displaying the downloaded video program at a playback rate that corresponds to a display quality;

a memory device for buffering excess portions of the downloaded program that result when a rate at which the program is being downloaded exceeds a rate at which the video program is displayed; and a processor, coupled to the receiver, display and memory device, for increasing the number of layers being downloaded, and the playback rate at which the program is displayed to increase the display quality, when the buffered excess portions of the downloaded program exceeds a threshold level.

10. The mobile terminal of claim 9, wherein the threshold level corresponds to a time duration of a remainder of the video program to be played back multiplied by a difference between the playback rate and the first data transfer rate.

11. The mobile terminal of claim 9, wherein the processor limits the playback rate to a maximum value that is equal to a sum of the first data transfer rate and a quotient resulting from dividing the buffered excess portions of the downloaded program by a time duration of the remainder of the program to be played back.

12. The mobile terminal of claim 9, wherein the processor increases the playback rate by an amount that corresponds to a number of layers being downloaded, such that each additional layer being downloaded results in an incremental change to the playback rate.

13. The mobile terminal of claim 9, wherein the receiver continues to download the program from the first radio access network while the processor maintains a last playback rate from the second radio access network for a duration of playing back the program, when the mobile terminal is again within a coverage area of the first radio access network.

14. The mobile terminal of claim 9, wherein the processor maintains a last playback rate from the second radio access network for a duration of playing back the layered media, when the mobile terminal is again within a coverage area of the first radio access network and the program has been completely downloaded.

15. The mobile terminal of claim 9, further comprising a transmitter for transmitting to a source of the program a request to increase the number of layers being transmitted, in respond to a command issued by the processor.

16. The mobile terminal of claim 10, wherein the first radio access network is a 3G cellular network and the second radio access network is a Wireless Local Area Network (WLAN).

17. A method for downloading and displaying a video program using a mobile device in an interworking environment that includes a first radio access network having a first data transfer rate and a second radio access network having a second data transfer rate that is faster than the first data transfer rate, the method comprising the steps of:

downloading, via the first or second radio access networks, a layer of the video program encoded into multiple layers, the video program being downloaded at the faster data transfer rate when the mobile terminal is in the coverage area of the second radio access network;

displaying the downloaded video program at a playback rate that corresponds to a display quality;

downloading a current layer and a next layer of the video program at the same time when the mobile terminal enters the coverage area of the second radio access network; and increasing the playback rate at which the video program is displayed to increase the display quality, when the next layer has been completely downloaded.

18. The method of claim 17, wherein the multiple layers comprise a base layer and at least one subsequent layer, each of the at least one subsequent layer being associated with an incremental change to the playback rate, and wherein said increasing step increases the playback rate by an amount that corresponds to the next layer.

19. The method of claim 17, further comprising the step of continuing to download the video program from the first radio access network while maintaining a last playback rate from the second radio access network for a duration of playing back the video program, when the mobile terminal is again within the coverage area of the first radio access network.

20. The method of claim 17, further comprising the step of maintaining a last playback rate from the second radio access network for a duration of playing back the layered media, when the mobile terminal is again within the coverage area of the first radio access network and the entire video program has been completely downloaded.

21. The method of claim 17, wherein the second downloading step comprises downloading the next layer starting from a current playback point.

22. The method of claim 19, wherein the first radio access network is a 3G cellular network and the second radio access network is a Wireless Local Area Network (WLAN).

23. A mobile terminal for downloading and displaying a video program in an interworking environment that includes a first radio access network having a first data transfer rate and a second radio access network having a second data transfer rate that is faster than the first data transfer rate, the mobile terminal comprising:

a receiver for downloading, via the first or second radio access networks, a layer of the video program encoded into multiple layers, the video program being downloaded at the faster data transfer rate when the mobile terminal is in the coverage area of the second radio access network, the receiver downloading a current layer and a next layer of the video program at the same time when the mobile terminal enters the coverage area of the second radio access network even if a preceding layer of the video program is still being downloaded;

a display for displaying the downloaded video program at a playback rate that corresponds to a display quality; and a processor, coupled to the receiver, and display, for increasing the playback rate at which the video program is displayed to thereby increase the display quality when the next layer has been completely downloaded.

24. The mobile terminal of claim 23, wherein the multiple layers comprise a base layer and at least one subsequent layer, each of the at least one subsequent layer being associated with an incremental change to the playback rate, and wherein the display increases the playback rate by an amount that corresponds to the next layer.

25. The mobile terminal of claim 23, wherein the processor maintains a last playback rate from the second radio access network for a duration of playing back the video program, when the mobile terminal is again within a coverage area of the first radio access network.

26. The mobile terminal of claim 23, wherein the processor maintains a last playback rate from the second radio access network for a duration of playing back the layered media, when the mobile terminal is again within a coverage area of the first radio access network and the entire video program has been completely downloaded.

27. The mobile terminal of claim 23, wherein the receiver downloads the next layer of the video program starting from a current playback point.

28. The mobile terminal of claim 23, wherein the first radio access network is a 3G cellular network and the second radio access network is a Wireless Local Area Network (WLAN).

* * * * *